(12) United States Patent
Todoroki et al.

(10) Patent No.: US 8,922,605 B2
(45) Date of Patent: Dec. 30, 2014

(54) PROJECTOR, IMAGE DISPLAY SYSTEM, AND IMAGE PROCESSING SYSTEM

(75) Inventors: Akinari Todoroki, Okaya (JP); Takahiro Amari, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1794 days.

(21) Appl. No.: 12/153,983

(22) Filed: May 28, 2008

(65) Prior Publication Data

US 2008/0297542 A1    Dec. 4, 2008

(30) Foreign Application Priority Data

May 30, 2007    (JP) ................. 2007-143187

(51) Int. Cl.
| | | |
|---|---|---|
| G09G 5/02 | (2006.01) | |
| G09G 5/36 | (2006.01) | |
| G09G 5/391 | (2006.01) | |
| G09G 3/00 | (2006.01) | |
| G06T 3/40 | (2006.01) | |
| H04N 9/31 | (2006.01) | |
| G09G 3/20 | (2006.01) | |

(52) U.S. Cl.
CPC .......... *G06T 3/40* (2013.01); *G09G 2340/0421* (2013.01); *G09G 5/363* (2013.01); *G09G 5/391* (2013.01); *G09G 3/002* (2013.01); *H04N 9/3188* (2013.01); *G09G 3/20* (2013.01); *G09G 2340/0414* (2013.01)
USPC .......................................... 345/698; 345/699

(58) Field of Classification Search
CPC ....... G09G 5/001; G09G 5/373; G09G 5/391; G09G 2340/04; G09G 2340/0407; G09G 2340/0414; G09G 2340/0421
USPC .................... 345/87–104, 698–699
See application file for complete search history.

(56) References Cited

U.S. PATENT DOCUMENTS

| | | | | |
|---|---|---|---|---|
| 5,874,937 A | * | 2/1999 | Kesatoshi | 345/428 |
| 7,116,379 B2 | | 10/2006 | Suzuki | |
| 7,535,455 B2 | * | 5/2009 | Sakashita | 345/156 |
| 8,184,084 B2 | * | 5/2012 | Furuhashi et al. | 345/98 |

(Continued)

FOREIGN PATENT DOCUMENTS

| | | |
|---|---|---|
| EP | 0 975 155 A2 | 1/2000 |
| JP | A-2000-284757 | 10/2000 |

(Continued)

OTHER PUBLICATIONS

European Search Report issued in European Application No. 08 25 1878 on Oct. 8, 2009.

(Continued)

*Primary Examiner* — Alexander Eisen
*Assistant Examiner* — Nelson Lam
(74) *Attorney, Agent, or Firm* — Oliff PLC (57) ABSTRACT

The image processing device stores a fixed horizontal resolution and a fixed vertical resolution established in advance for use in resolution conversion of an input image. The first resolution converter of the image processing device converts the input image to a fixed resolution-converted image so that at least a horizontal resolution of the fixed resolution-converted image is equal to the fixed horizontal resolution. The second resolution converter of the image processing device converts the fixed resolution-converted image output from the first resolution converter to the display resolution-converted image having the desired horizontal and vertical resolutions.

8 Claims, 6 Drawing Sheets

(56) References Cited

U.S. PATENT DOCUMENTS

| | | | |
|---|---|---|---|
| 8,264,586 B2* | 9/2012 | Higuchi | 348/333.11 |
| 2001/0035870 A1* | 11/2001 | Takeuchi et al. | 345/630 |
| 2002/0003838 A1 | 1/2002 | Takahashi et al. | |
| 2002/0063710 A1 | 5/2002 | Hirota et al. | |
| 2002/0089525 A1* | 7/2002 | Huang | 345/698 |
| 2002/0097921 A1 | 7/2002 | Wakisawa et al. | |
| 2003/0020885 A1 | 1/2003 | Suzuki | |
| 2003/0039409 A1 | 2/2003 | Ueda | |
| 2004/0130562 A1* | 7/2004 | Yoo | 345/698 |
| 2004/0263426 A1* | 12/2004 | Endo | 345/2.2 |
| 2005/0078052 A1 | 4/2005 | Morichika | |
| 2005/0093886 A1 | 5/2005 | Kubota | |
| 2005/0253878 A1* | 11/2005 | Kubo et al. | 345/698 |
| 2005/0259122 A1* | 11/2005 | Cole et al. | 345/698 |
| 2006/0012616 A1* | 1/2006 | Paek | 345/698 |
| 2006/0092189 A1* | 5/2006 | Allen et al. | 345/698 |
| 2006/0114275 A1* | 6/2006 | Kim et al. | 345/698 |
| 2006/0187174 A1* | 8/2006 | Furuhashi et al. | 345/98 |
| 2007/0132881 A1* | 6/2007 | Tani | 348/441 |
| 2008/0001977 A1* | 1/2008 | Aufranc et al. | 345/698 |
| 2008/0030527 A1* | 2/2008 | Namie et al. | 345/698 |
| 2008/0079757 A1* | 4/2008 | Hochmuth | 345/698 |
| 2008/0316146 A1* | 12/2008 | Todoroki | 345/7 |
| 2009/0231418 A1* | 9/2009 | Higuchi | 348/74 |

FOREIGN PATENT DOCUMENTS

| | | |
|---|---|---|
| JP | A-2002-044531 | 2/2002 |
| JP | A-2003-084738 | 3/2003 |
| JP | A-2003-143476 | 5/2003 |
| JP | A-2003-308528 | 10/2003 |
| JP | A-2006-165950 | 6/2006 |
| KR | A-2005-0036742 | 4/2005 |
| WO | WO 02/52844 A1 | 4/2002 |

OTHER PUBLICATIONS

May 28, 2014 Summons to Attend Oral Proceedings issued in European Patent Application No. 08251878.8.

* cited by examiner

PROJECTOR, IMAGE DISPLAY SYSTEM, AND IMAGE PROCESSING SYSTEM

CROSS-REFERENCE TO RELATED APPLICATIONS

The present application claims the priority based on Japanese Patent Application No. 2007-143187 filed on May 30, 2007, the disclosure of which is hereby incorporated by reference in its entirety.

BACKGROUND OF THE INVENTION

1. Field of the Invention

The present invention relates to an image display system which uses a fixed-pixel display device, particularly a projector, and to an image processing system adapted to an image display system.

2. Description of the Related Art

Some display devices are capable of displaying various images of different resolution; such display devices include projectors having liquid crystal panels or DMD (Digital Micromirror Devices, trademark of Texas Instruments Inc.), liquid crystal display devices having liquid crystal panels, plasma display devices having plasma display panels (PDP), and EL display devices having electroluminescent (EL) panels. For this reason, in instances where the resolution of an input image represented by an input image signal differs from the native resolution of a liquid crystal panel or other fixed-pixel display device being used, the image data contained in the input image signal (hereinafter also termed "input image data") is subjected to a resolution conversion process to convert the resolution of the image represented by the image data presented to the fixed-pixel display device (hereinafter also termed "image data for display") to the native resolution of the fixed-pixel display device. See JP2003-84738A for example.

The resolution of a image represented by image data will herein also be referred to simply as "image signal resolution" or "image data resolution." The term "resolution" is used herein to denote the number of dots in the horizontal direction (number of pixels) and the number of lines in the vertical direction (number of scan lines) of a image or of a fixed-pixel display device. The number of dots in the horizontal direction is also referred to as the "horizontal resolution" and the number of lines in the vertical direction as the "vertical resolution."

In conventional image display devices, resolution conversion (hereinafter also termed "display device-specific resolution conversion") is carried out for the purpose of matching the resolution of input image data to the resolution of the fixed-pixel display device. There are other instances in which a resolution conversion process is used. As in the case of a projector which projects an image onto a screen for example, in instances where the size of the projected image on the screen (also termed "projected size" herein) is adjusted in the projector, it would be conceivable, rather than converting the magnification of the projection lens, to instead utilize a resolution conversion process for the purpose of adjusting the resolution of image data being displayed, to an arbitrary resolution which is different from the resolution of the fixed-pixel display device and which matches the projected size. The use of a resolution conversion process would also be conceivable in cases where only a portion of an input image is to be displayed. Similarly, in other direct-view image display devices, the use of resolution conversion processes would be conceivable in cases where an image is to be displayed at an arbitrary screen size rather than at the full-screen size of the fixed-pixel display device; or where only a portion of an input image is to be displayed. Hereinbelow, resolution conversion for the purpose of converting the resolution of image data for display to an arbitrary resolution or of converting part of an input image to the resolution for an arbitrary window size for a particular native resolution of a fixed-pixel display device will also be referred to as "display size-specific resolution conversion."

In the case of a conventional image display device, in such instances the input image data would be written to a image memory called a frame memory; and when reading the written data a resolution conversion processor called a scaler would execute the display device-specific resolution conversion process. However, one problem with doing so is that in the resolution conversion processor it is difficult to execute a display size-specific resolution conversion process in addition to a display device-specific resolution conversion process.

For example, consider a case of carrying out a resolution conversion process which involves both a display device-specific resolution conversion process and a display size-specific resolution conversion process, executed in that order. Writing and reading of image data to and from the image memory will be necessary in the display device-specific resolution conversion process; and writing and reading of image data to and from the image memory will also be necessary in the display size-specific resolution conversion process. Thus, the frequency of read/write access to the image memory will entail longer processing times as the amount of image data increases, thus posing the risk of degraded image processing capability.

SUMMARY OF THE INVENTION

An object of the present invention is to provide technology that will make it possible to carry out resolution conversion easily, while minimizing degradation in image processing capability.

According to an aspect of the present invention, there is provided a projector for projecting an image, comprising a fixed-pixel display device; and an image processor. The image processor performs resolution conversion on an input image represented by an input image signal to produce a display resolution-converted image having desired horizontal and vertical resolutions in order to display the same on the fixed-pixel display device. The desired horizontal and vertical resolutions are set equal to or lower than horizontal and vertical resolutions of the fixed-pixel display device, respectively. A fixed horizontal resolution and a fixed vertical resolution are set in advance in the image processor for use in the resolution conversion of the input image. The image processor includes a first resolution converter, and a second resolution converter. The first resolution converter performs at least horizontal resolution conversion on the input image to produce a fixed resolution-converted image so that at least a horizontal resolution of the fixed resolution-converted image is equal to the fixed horizontal resolution. The second resolution converter performs resolution conversion on the fixed resolution-converted image output from the first resolution converter to produce the display resolution-converted image having the desired horizontal and vertical resolutions.

With the above projector, an input image is converted by the first resolution converter to a fixed resolution-converted image having resolution equal at least to the horizontal resolution of the fixed resolution; and the fixed resolution-converted image output by the first resolution converter is then converted by the second resolution converter to a display resolution-converted image having the desired resolution, thus making it possible to carry out resolution conversion easily while minimizing the degradation in image processing capability which was a problem encountered in the prior art.

The present invention is not limited to a projector, and may be reduced to practice in various other modes such as an image display apparatus, an image processing device, or an image processing method.

DESCRIPTION OF THE PREFERRED EMBODIMENT

Embodiments of the present invention will be described below in the following order.
A. Configuration of Liquid Crystal Projector
B. Parameter Setting Operation for Liquid Crystal Projector
C. Resolution Conversion Parameter Setting Operation
D. Configuration and Operation of Resolution Converters
E. Effects
F. Modification Examples

A. CONFIGURATION OF LIQUID CRYSTAL PROJECTOR

Figure 1:
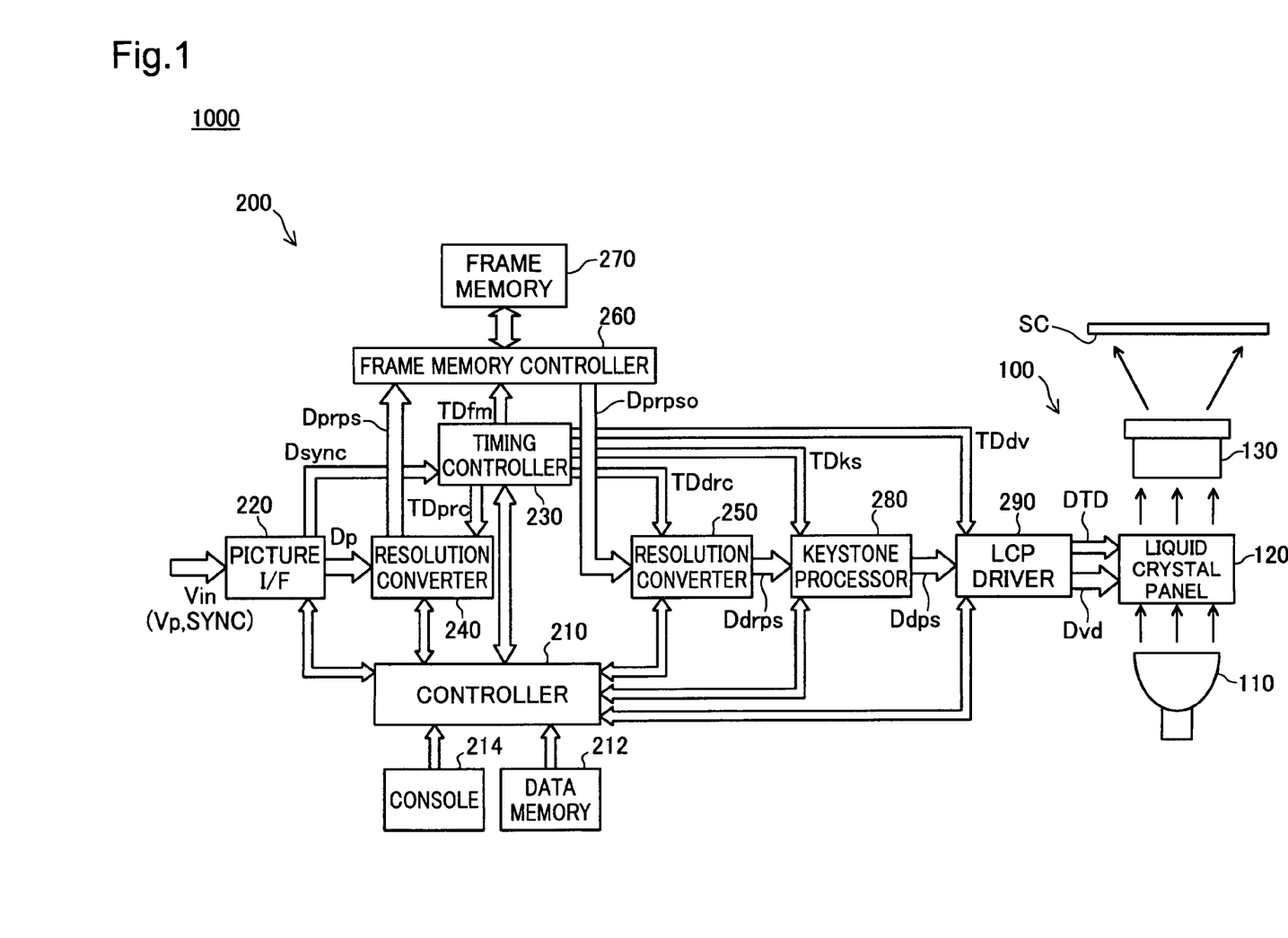
FIG. 1 is a block diagram depicting a configuration of a liquid crystal projector in a first embodiment of the present invention.

FIG. 1 is a block diagram depicting a configuration of a liquid crystal projector in a first embodiment of the invention. This liquid crystal projector 1000 is a projection type display apparatus for displaying a image which is represented by an input image signal Vin on a screen SC. The projector is furnished with an optical system 100 and an image processing device 200.

The optical system 100 is furnished with a light source 110, a liquid crystal panel 120 as a fixed-pixel display device, and a projection lens 130. According to a driving image data signal Dvd and a drive timing signal DTD provided by the image processing device 200, the light emitted from the light source 110 is converted in the liquid crystal panel 120 into light representing an image (also termed a light image), which is then magnified and projected onto the screen SC by the projection lens 130.

While not shown in the drawing, the liquid crystal projector 1000 is actually furnished with three liquid crystal panels 120 for respectively modulating light of the colors R (red), G (green), and B (blue); light emitted from the light source 110 is separated by a color separation optical system (not shown) into light of the colors R, G, and B, which is converted in the corresponding liquid crystal panels to light images of each color which are then synthesized by a synthesizing optical system (not shown) and directed onto the projection lens 130.

The image processing device 200 includes a controller 210, a image input interface 220, a timing controller 230, two resolution converters 240, 250, a frame memory controller 260, a frame memory 270, a keystone processor 280, and a liquid crystal panel driver 290.

The controller 210 includes a CPU and a memory, not shown; by reading and executing a control program stored in memory and by reading and utilizing data stored in a data memory 212, the controller 210 controls the operation of the blocks which are included in the image processing device 200. In this embodiment in particular, as described later, the controller 210 derives particular data for use in the resolution conversions which are to be carried out according to a detected input image resolution, or to a projected size or partial display settings input and set by the user via a console 214, and the controller 210 sets the resolution conversion parameters in the first and second resolution converters 240, 250.

The image input I/F 220 derives an analog or digital input image data signal Vp from the input image signal Vin, and outputs a digital image data signal Dp to the first resolution converter 240. The image input I/F 220 also derives an input timing signal Dsync from a sync signal Sync contained in the input image signal Vin, and outputs the input timing signal Dsync to the timing controller 230. The image input I/F 220 further derives data needed for detecting the resolution of the input image signal (hereinafter termed "resolution detection data"), and supplies the resolution detection data to the controller 210. The resolution detection data includes various data relating to frequencies and timings of the horizontal sync signal and the vertical sync signal.

Based on the input timing signal Dsync, the timing controller 230 generates timing control signals TDprc, TDdrc, TDfm, TDks, and TDdv for controlling operations of the first and second resolution converters 240, 250, the frame memory controller 260, the keystone processor 280, and the liquid crystal panel driver 290.

The first resolution converter 240 convert the resolution of the digital image data signal Dp input from the image input I/F 220 to a fixed resolution which has been set in advance (hereinafter termed "fixed resolution") and output the resulting image data to the frame memory controller 260. The resolution of the liquid crystal panel 120 (hereinafter termed "panel resolution") is used as this fixed resolution. In this example, a liquid crystal panel having XGA (1024-dot horizontal resolution×768-line vertical resolution) panel resolution is used as the liquid crystal panel 120. The first resolution converter 240 stores data for use in the resolution conversion to the fixed resolution (hereinafter termed "fixed-resolution conversion parameters"). The fixed-resolution conversion parameters are supplied from the controller 210 to the converter 240 during parameter setting operation, discussed later.

The frame memory controller 260 writes the image data contained in the image data signal Dprs input from the first resolution converter 240 (hereinafter termed the "fixed resolution-converted image data signal") to the frame memory 270 according to write timing included in the timing signal TDfm supplied by the timing controller 230. The frame memory controller 260 reads out image data which has been written to the frame memory 270, and outputs the image data to the second resolution converter 250 according to the read timing signal included in the timing signal TDfm supplied by the timing controller 230. The write timing signal and the read timing signal are generated from the input timing signal Dsync. However, the read timing signal may instead be generated from an independent timing signal different from the input timing signal Dsync.

The second resolution converter 250 converts the resolution of the image data signal Dprpso input from the frame memory controller 260 (hereinafter termed the "read-out fixed resolution-converted image data signal") to a preset variable resolution (hereinafter termed the "display resolution"), and outputs the resulting image signal to the keystone processor 280. The maximum value for the set display resolution will be the panel resolution of the liquid crystal panel 120. The second resolution converter 250 stores data for use in the resolution conversion to the display resolution (hereinafter termed "display resolution conversion parameters"). The display resolution conversion parameters are supplied from the controller 210 to the second resolution converter 250 during parameter setting operation, discussed later.

The keystone processor 280 executes a keystone correction process on the image data signal Ddrps which is input from the second resolution converter 250 (hereinafter termed the "display resolution-converted image data signal"), and outputs the resulting image signal to the liquid crystal panel driver 290. The keystone processor 280 stores data for use in the keystone correction (hereinafter termed "keystone correction parameters"). The keystone correction parameters are supplied from the controller 210 to the keystone processor 280 during parameter setting operation, discussed later.

The liquid crystal panel driver 290 converts the image data signal Ddps input from the keystone processor 280 into the driving image data signal Dvd suitable for presentation to the liquid crystal panel 120, and outputs this signal together with the drive timing signal DTD.

The liquid crystal panel 120 which has input the driving image data signal Dvd and the drive timing signal DTD from the liquid crystal panel driver 290 will then modulate the light emitted by the light source 110 in accordance with the driving image data signal Dvd as discussed earlier, converting the light into a light image in accordance with the driving image data signal Dvd. This light image will be enlarged and projected on the screen SC by the projection lens 130.

B. PARAMETER SETTING OPERATION FOR LIQUID CRYSTAL PROJECTOR

Figure 2:
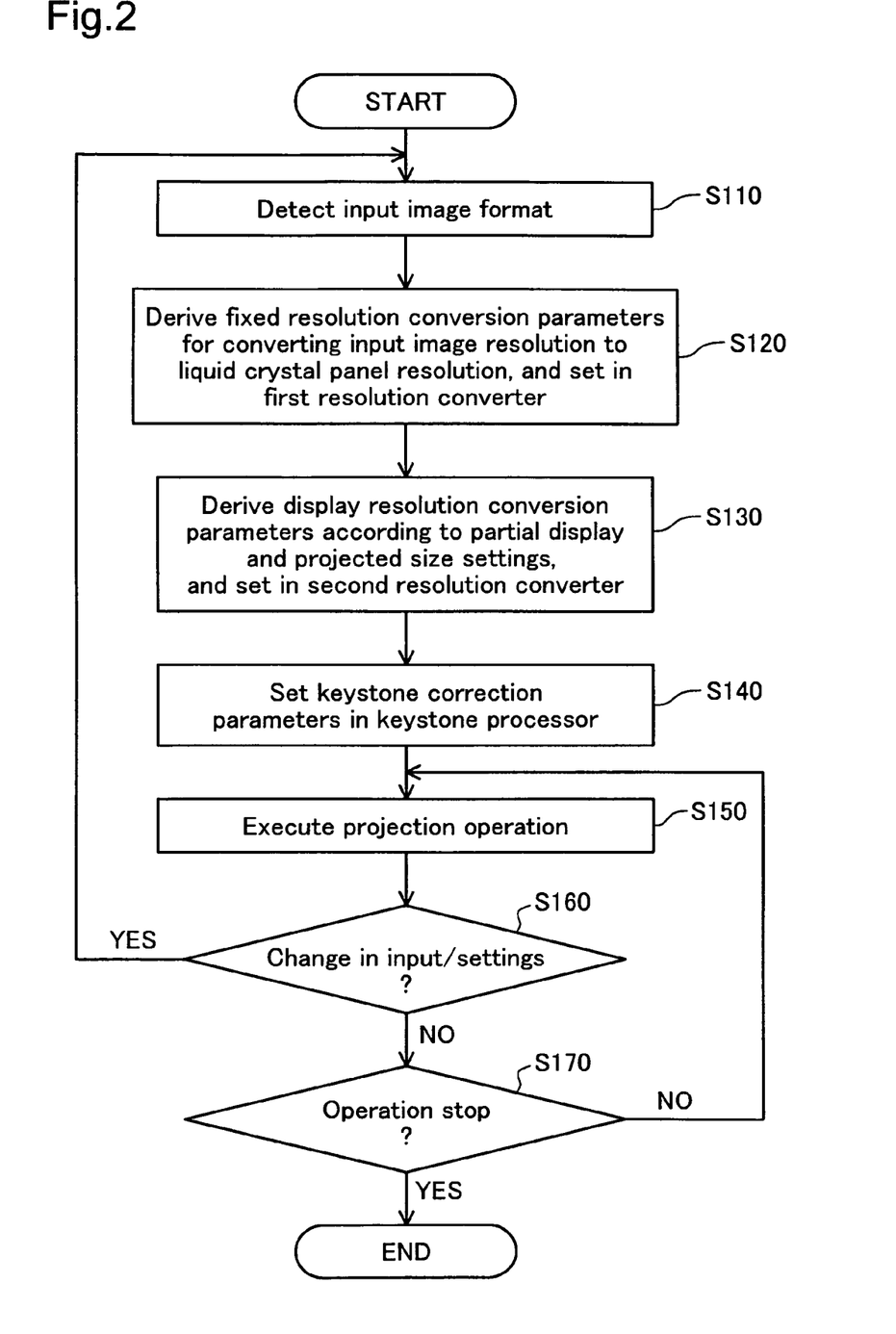
FIG. 2 is an illustration depicting a setting operation of the liquid crystal projector.

FIG. 2 is an illustration depicting the parameter setting operation of the liquid crystal projector. The parameter setting operation is initiated by the controller 210, at prescribed timing during initialization initiated when the projector is powered up.

When this parameter setting operation is initiated, the format of the input image represented by the input image signal Vin, specifically, its resolution and whether it is progressive mode or non-progressive mode (non-interlaced/interlaced), is detected in Step 110. The input image format can easily be detected from the timing and frequency of the vertical sync signal and the horizontal sync signal which make up the sync signal SYNC contained in the input image signal Vin.

Next, fixed-resolution conversion parameters are derived, and set in the first resolution converter 240 in Step 120. The fixed-resolution conversion parameters are to be used in converting detected resolution of the input image to a fixed resolution.

Also, display-resolution conversion parameters are derived from partial display settings and projected size settings which have been set in advance, and are set in the second resolution converter 250 in Step 130. The display-resolution conversion parameters are to be used in converting the resolution of the fixed-resolution image obtained by the first resolution converter 240 to the display resolution. The partial display settings are made by the user, through operation of the console 214 to select and set an area which is to be displayed, excluding the other areas. The projected size settings are made by the user, by operating the console 214 to change the projected size.

Also, keystone correction parameters for use in the keystone correction are set in the keystone processor 280 in Step 140.

Then, on the basis of the parameters that have been set in Steps S120 and S130, the circuit blocks are operated to perform the projection operation in Step S150.

Next, an input/settings change determination in Step S160, and an operation stop determination in Step S170 are carried out. In the event that there has been no change in input by the user via the console 214 or in the settings resulting from this input, nor has there been any change in the settings executed automatically by the controller 210, or any operation stop (Step S160: NO; Step S170: NO), the projection operation will continue to be executed with the same parameters that have been set previously in Steps S120 through S140. In the event there has been a change in input or settings (Step S160: YES), the system will return to the initial process in Step S110, and after re-performing the various setting operations, will execute the projection operation using these reset parameters. In the event of an operation stop (Step S160: NO; Step S170: YES), the parameter settings operation will terminate.

The parameter setting operation for the liquid crystal projector is executed in the manner described above.

C. RESOLUTION CONVERSION PARAMETER SETTING OPERATION

The resolution conversion operations carried out by the resolution converters 240, 250 will be described; a resolution conversion operation according to projected size, and a resolution conversion operation according to partial display will be discussed in that order.

Figure 3:
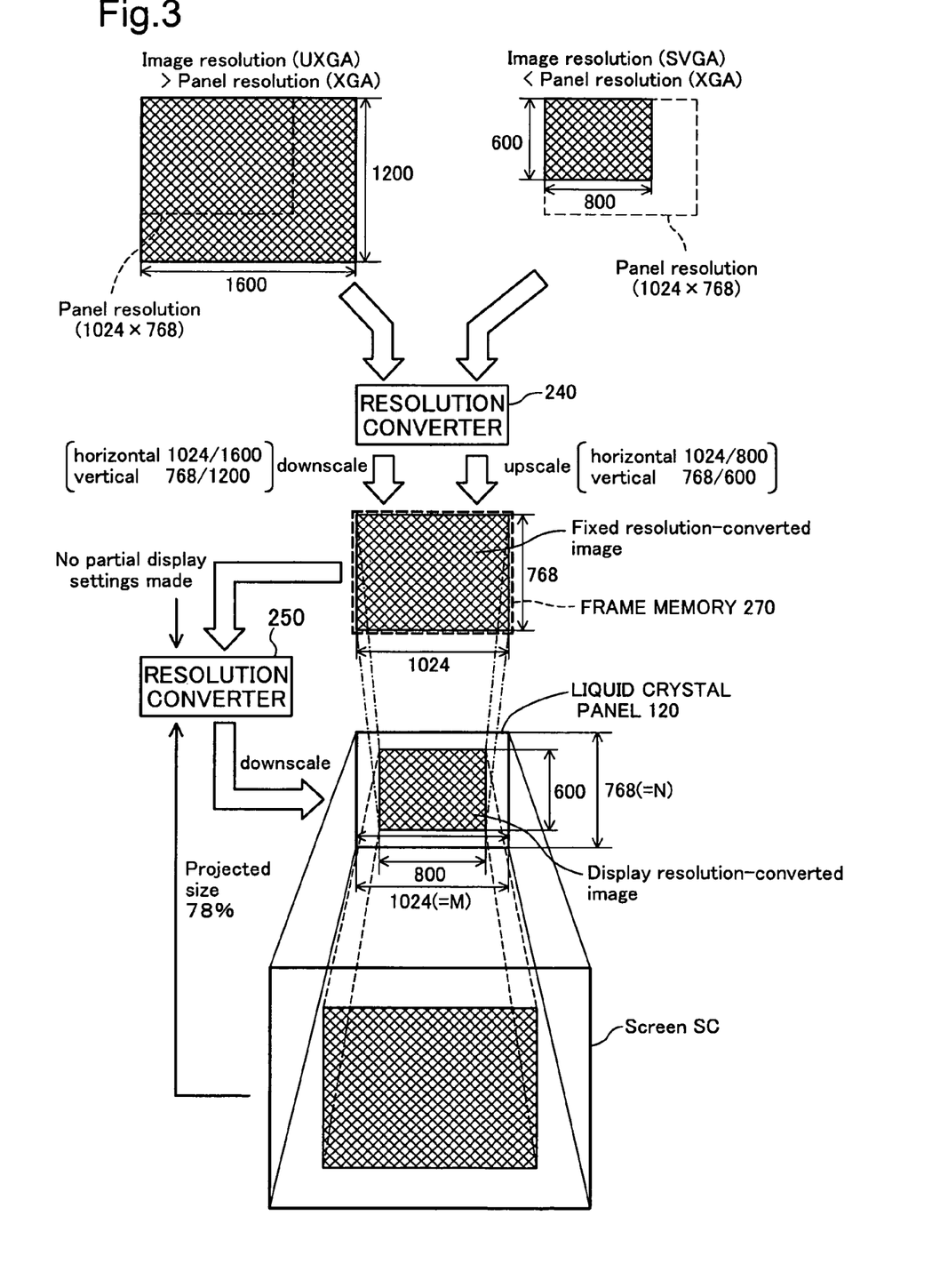
FIG. 3 is an illustration depicting a resolution conversion process executed by first and second resolution converters with reference to projected size.

FIG. 3 is an illustration depicting a resolution conversion process executed by the first and second resolution converters with reference to a projected size. Assume that there is no partial display, and that the projected size is 78% relative to the maximum size displayable on the screen SC (i.e. when the liquid crystal panel 120 is presented with image data equivalent to the panel resolution).

In the first resolution converter 240 the resolution of the input image is converted to the panel resolution. For example, where the image resolution is UXGA (1600-dot horizontal resolution×1200-line vertical resolution), the horizontal resolution is downscaled by 1024/1600, and the vertical resolution is downscaled by 768/1200. Where the image resolution is SVGA (800-dot horizontal resolution×600-line vertical resolution), the horizontal resolution is upscaled by 1024/800, and the vertical resolution is enlarged by 768/600.

In the second resolution converter 250, the resolution of the fixed resolution-converted image generated by the first resolution converter 240 is converted to a display resolution which corresponds to the projection size. For example, in the present example, since the projection size is 78%, the horizontal resolution and the vertical resolution are set to 78/100, i.e. downscaled to horizontal resolution of 800 dots and vertical resolution of 600 lines.

In the second resolution converter 250, in the event that the resolution of the display resolution-converted image is lower than the resolution of the liquid crystal panel, areas in which no image is displayed appear on the liquid crystal panel 120

(the peripheral areas of the display resolution-converted image shown on the liquid crystal panel 120). With a fixed-pixel display device such as a liquid crystal panel, it may be necessary for black image data representing a black image to be provided for the no image display area. Accordingly, in such cases, in the downstream keystone processor 280, black image data is added for the areas outside the display resolution-converted image for output.

Through the resolution conversions by the first and second resolution converters 240, 250 in the manner described above, an image of the desired projection size will be displayed on the screen SC.

C2. Resolution Conversion Operation According to Partial Display

Figure 4:
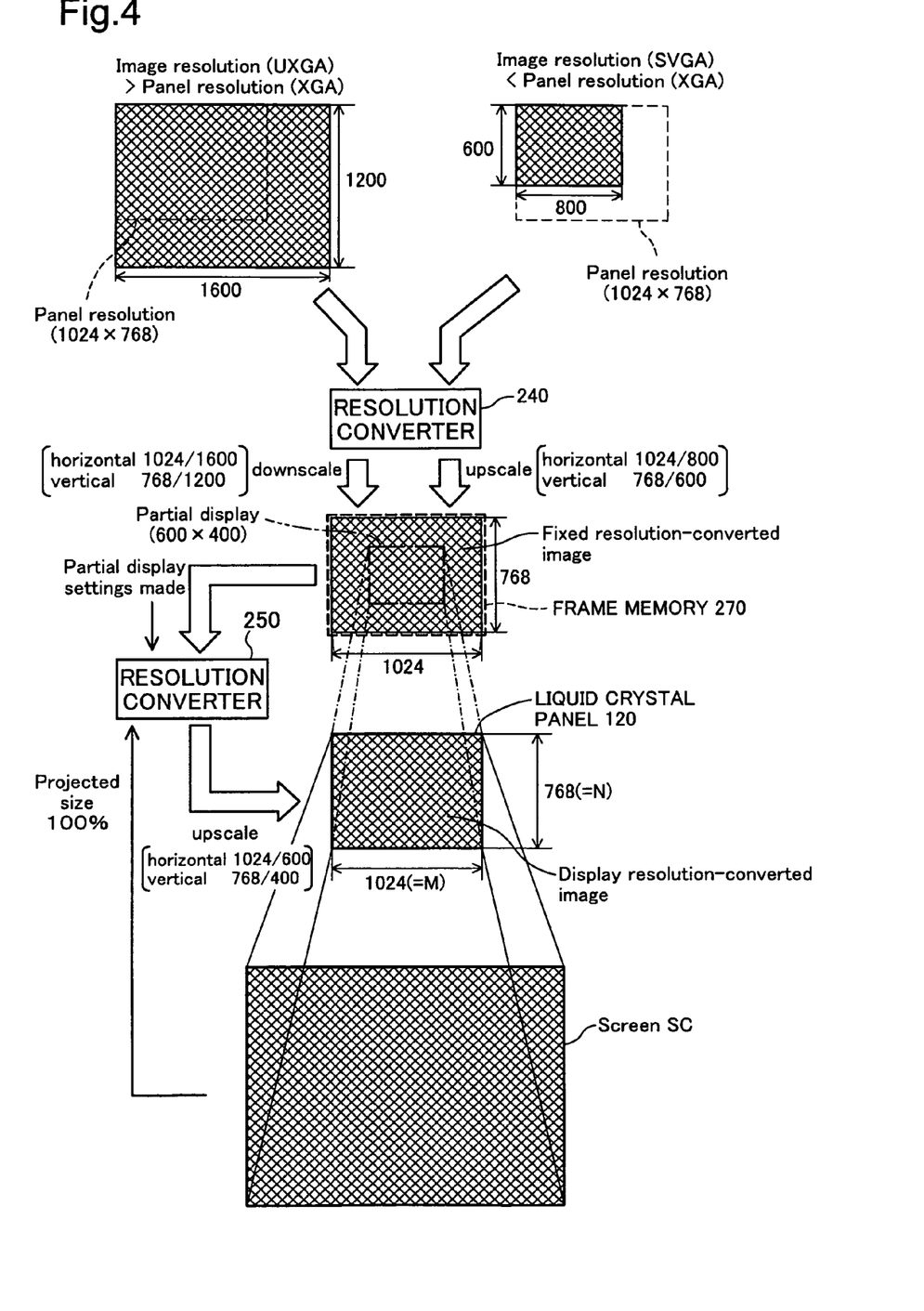
FIG. 4 is an illustration depicting a resolution conversion process executed by the first and second resolution converters with reference to partial display settings.

FIG. 4 is an illustration depicting a resolution conversion process executed by the first and second resolution converters with reference to partial display settings. It is assumed here that the projected size is 100%.

In the first resolution converter 240 the resolution of the input image is converted to the panel resolution, in the same manner as for resolution conversion according to projected size.

Then, in the second resolution converter 250, the resolution of a part of the fixed resolution-converted image generated by the first resolution converter 240 is converted to a display resolution according to the partial display settings. Assume here that the partial area drawn by the dashed-two dotted line within the fixed resolution-converted image is desired to be projected on the screen SC as a partial display, and that the partial area has horizontal resolution of 600 dots and vertical resolution of 400 lines. In this case, only this partial area within the fixed resolution-converted image is upscaled horizontally by 1024/600 and vertically by 768/400.

Through execution of resolution conversions by the first and second resolution converters 240, 250 in the manner described above, only the selected area will be displayed on the screen SC.

While the preceding discussion assumed projected size of 100%, size is not limited to this and partial display at various projected sizes other than 100% is also possible. In such cases, the resolution of the image for partial display may be upscaled or downscaled by a total scaling factor derived by multiplying a scaling factor for enlarging to the panel resolution by another scaling factor for reducing to a projected size.

D. CONFIGURATION AND OPERATION OF RESOLUTION CONVERTERS

The first and second resolution converters 240, 250 may have the configuration and operation described below so that the resolution of the image represented by an input image is converted by the first resolution converter 240 to a fixed resolution equivalent to the resolution of the liquid crystal panel 120, and the resolution of the entire fixed resolution-converted image or a portion thereof is then converted by the second resolution converter 250 to a resolution equal to or lower than the resolution of the liquid crystal 120.

Figure 5:
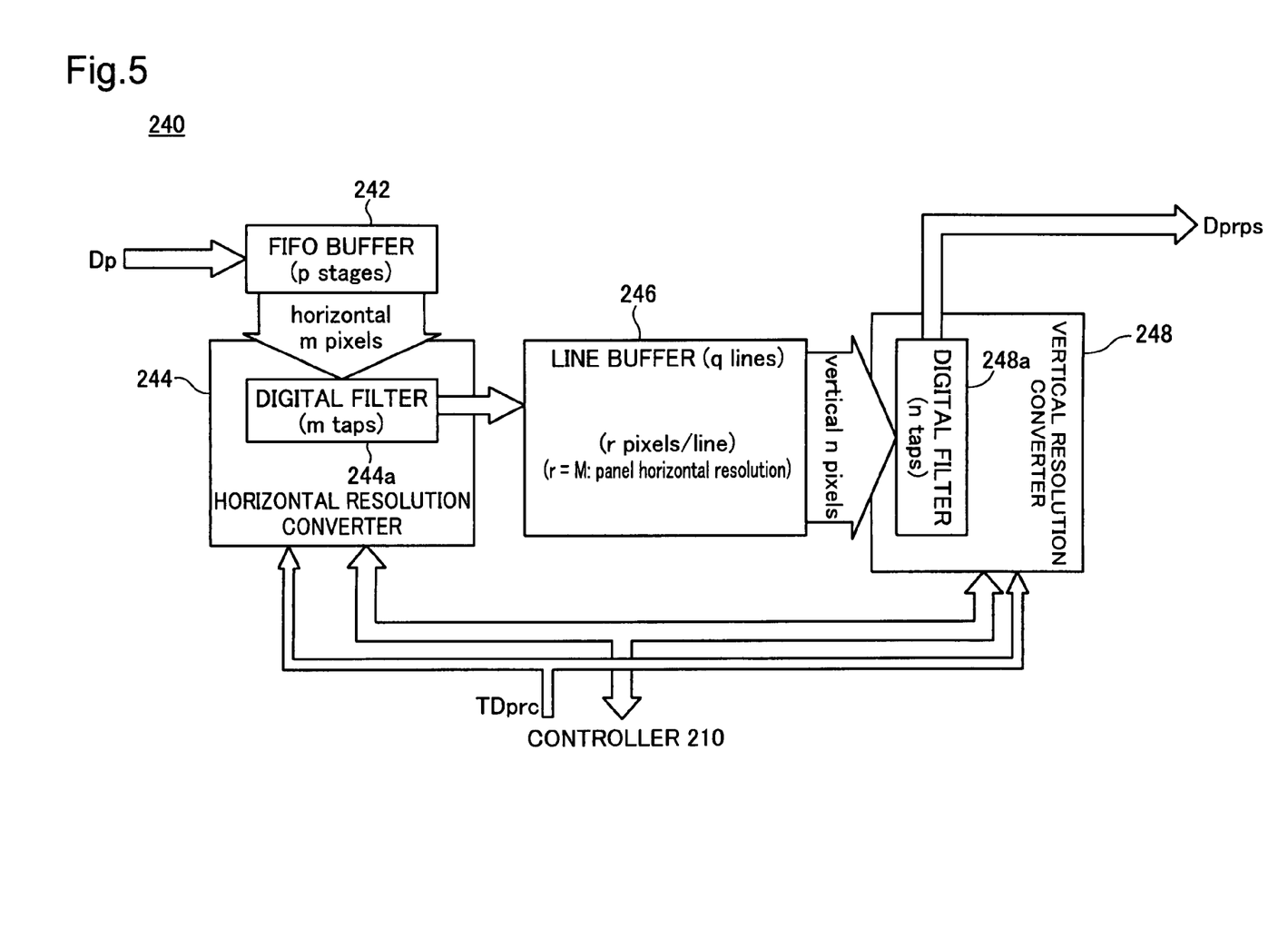
FIG. 5 is a block diagram depicting internal configuration of the first resolution converter.

FIG. 5 is a block diagram depicting internal configuration of the first resolution converter. The first resolution converter 240 includes a FIFO buffer 242, a horizontal resolution converter 244, a line buffer 246, and a vertical resolution converter 248.

The horizontal resolution converter 244 may be constituted by an ordinary resolution conversion circuit that employs an m-tap digital filter 244a where m is an integer equal to 2 or greater. In this example, the tap number m is 16.

The vertical resolution converter 248, like the horizontal resolution converter 244, may be constituted by an ordinary resolution conversion circuit that employs an n-tap digital filter 248a where n is an integer equal to 2 or greater. The tap number n is 16, the same as the tap number m of the horizontal resolution converter 244. However, the tap numbers need not be the same.

The fixed-resolution conversion parameters supplied by the controller 210 are set in the horizontal resolution converter 244 and the vertical resolution converter 248.

The internal configuration of the horizontal resolution converter 244 and the vertical resolution converter 248 is not limited in any particular way, provided they are resolution conversion circuits that employ a digital filter.

The FIFO buffer 242 has p-stage pixel storage areas; and of the pixel data stored in the p-stage pixel storage areas the pixel data of m pixels is sequentially output to the horizontal resolution converter 244. The number of stages p is set to a number equal to or greater than the number m, which is needed for reliable storage in the FIFO buffer 242 of the pixel data of m pixels supplied to the digital filter 244a. In this example, the number of stages p is 24.

The line buffer 246 stores, in order in horizontal line increments, q lines of the horizontal resolution-converted image data which is output by the horizontal resolution converter 244; and of the stored pixel data of q pixels of each vertical column, sequentially outputs to the vertical resolution converter 248 the pixel data of n pixels for particular n lines. The line number q in the line buffer 246 is set to a number equal to or greater than the number n, which is needed for reliable storage of the data of n pixels in the digital filter 248a. In the present example, the line number q is 24.

Figure 6:
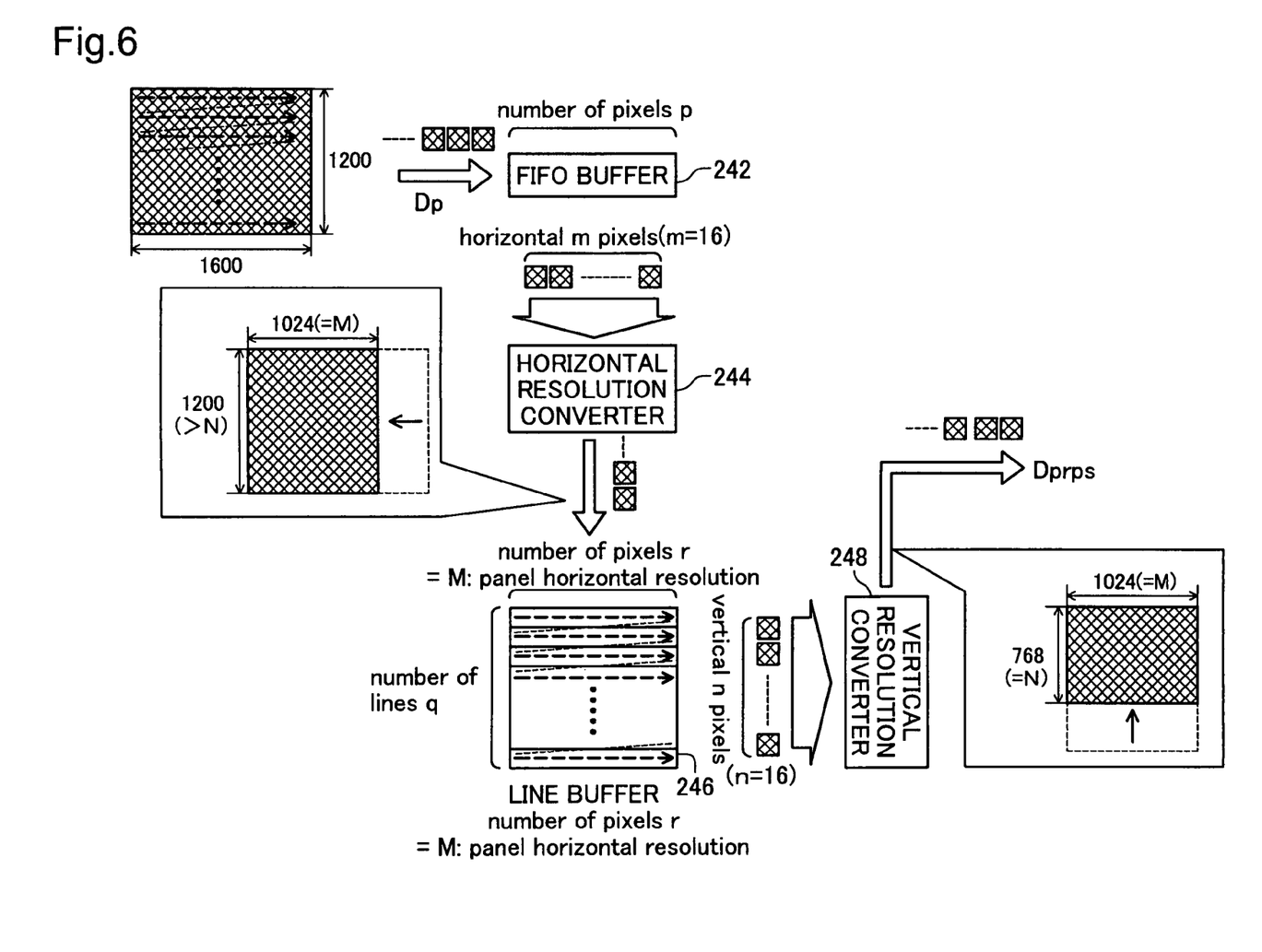
FIG. 6 is an illustration depicting operation of a horizontal resolution converter and a vertical resolution converter in the first resolution converter.

FIG. 6 is an illustration depicting operation of the horizontal resolution converter and the vertical resolution converter in the first resolution converter. A digital image data signal Dp representing the input image is input sequentially to the FIFO buffer 242 starting with the lead pixel, and is stored sequentially in the p-stage pixel storage areas. Of the pixel data of the p (=24) pixels that have been sequentially stored, pixel data of m (=16) pixels is output in order in m-pixel increments from the FIFO buffer 242 to the horizontal resolution converter 244.

In the horizontal resolution converter 244, a filter process is carried out according to the fixed-resolution conversion parameters on the pixel data of the horizontal m pixels which are input in m-pixel increments from the FIFO buffer 242, thereby generating image data in which only the horizontal resolution has been converted to the equivalent of the fixed horizontal resolution of the liquid crystal panel 120. The image at this stage has a horizontal resolution of 1024 dots, and a vertical resolution of 1200 lines.

The horizontal resolution-converted image data which is output sequentially from the horizontal resolution converter 244 is now stored in horizontal line increments in the line buffer 246; and of the stored pixel data of q (=24) pixels of each column along the vertical direction, pixel data of n (=16) pixels are output sequentially in n-pixel increments to the vertical resolution converter 248.

In the vertical resolution converter 248, a filter process is carried out according to the fixed-resolution conversion parameters on the pixel data of n pixels in the vertical direction which are input in n-pixel increments from the line buffer 246, thereby generating image data in which only the vertical resolution has been converted to the equivalent of the fixed vertical resolution of the liquid crystal panel 12. The resulting image has a horizontal resolution of 1024 dots and a vertical resolution of 768 lines.

In the manner described above, the first resolution converter 240 will convert the resolution of the input digital image data signal Dp to a fixed resolution which has been set in advance (hereinafter termed "fixed resolution") and output a fixed resolution-converted image data signal Dprps.

While not illustrated or described here, by operating in a manner analogous to the first resolution converter 240, the second resolution converter 250 will convert the horizontal resolution of an image represented by an input fixed resolution-converted image data signal Dprpso according to a variable display resolution which has been set in advance, and convert the vertical resolution of the horizontal resolution-converted image according to the display resolution to output a display resolution-converted image signal Ddrps.

E. EFFECTS

In the liquid crystal projector 1000 of the present embodiment discussed above, the resolution of a image represented by input image data is converted to a fixed resolution which is equal to the resolution of the liquid crystal panel 120, and is stored in the frame memory 270. Then, the resolution of all or a portion of the fixed resolution-converted image represented by fixed resolution-converted data which has been stored in the frame memory 270 is converted by the second resolution converter 250 to a resolution equal to or lower than the resolution of the liquid crystal panel 120. Thus the first resolution converter 240 accesses to the frame memory 270 only when writing the resolution-converted image data therein. Likewise the second resolution converter 250 accesses to the frame memory 270 only when reading out image data therefrom for resolution conversion. As a result, it will be possible to avoid the problem of frequent access to the frame memory (image memory) and associated degradation of image processing capability that will occur when display size-specific resolution conversion processing is carried out in addition to display device-specific resolution conversion processing as described in the prior art example. Moreover, since frequency of access to the frame memory will be reduced, overall power consumption by the device will be reduced as well.

In another possible configuration of the first resolution converter 240, the horizontal resolution converter 244 may perform horizontal resolution conversion to the fixed horizontal resolution of the liquid crystal panel 120 on the input image data; and the vertical resolution converter 248 may then perform vertical resolution conversion to the vertical resolution of the liquid crystal panel 120. The memory provided between the horizontal resolution converter 244 and the vertical resolution converter 248 may be a line memory whose per-line pixel count is matched to the horizontal resolution of the liquid crystal panel 120, instead of a frame memory. The first resolution converter 240 will thereby be realized through a simpler and cheaper configuration. A similar configuration may be employed for the second resolution converter.

F. MODIFICATION EXAMPLES

Of the constituent elements which appear in the preceding embodiments, those other than elements specifically claimed in independent claims are optional elements and may be omitted where appropriate. The present invention is not limited to embodiments set forth hereinabove, and may be reduced to practice in various other modes without departing from the spirit and scope thereof. Modifications such as the following would be possible, for example.

F1. Modification Example 1

While the first resolution converter 240 performs resolution conversion to a fixed resolution which is equal to the resolution of the liquid crystal panel 120, its target resolution is not limited thereto, and may be any resolution determined in advance. However, it is preferable for the target resolution to be equal to the resolution of the liquid crystal panel 120 so that the resolution of the image data output from the second resolution converter may be equal to or lower than the resolution of the liquid crystal panel 120.

F2. Modification Example 2

In the liquid crystal projector 1000 depicted in FIG. 1, in the event that the image represented by the input image signal Vin is a progressive-mode image, a conversion circuit for conversion to a non-progressive mode image (termed an Interlace-Progressive conversion circuit) may be provided between the frame memory controller 260 and the second resolution converter 250. In this case, a step for establishing IP parameters for the purpose of operating the IP conversion circuit may be provided between any of Step S110 to S150 in FIG. 2. Also, of the resolution conversion operations performed in the first resolution converter, the vertical resolution conversion operation may be omitted, since this will be executed by the IP conversion circuit instead.

F3. Modification Example 3

While the liquid crystal projector 1000 uses a liquid crystal panel 120, the present invention is not limited thereto and may be implemented in projectors employing any of various kinds of fixed-pixel display devices, or in direct-view image display systems. The fixed-pixel display device may be a liquid crystal panel, a Plasma Display Panel, an Electro-Luminescent panel, a Digital Mirror Device panel or the like.

What is claimed is:

1. A projector for projecting an image, comprising:
   a fixed-pixel display device; and
   an image processor for performing resolution conversion on an input image represented by an input image signal to produce a display resolution-converted image having user-defined horizontal and vertical resolutions in order to display the same on the fixed-pixel display device, the user-defined horizontal and vertical resolutions being set equal to or lower than horizontal and vertical resolutions of the fixed-pixel display device, respectively,
   wherein a fixed horizontal resolution and a fixed vertical resolution are set in advance in the image processor for use in the resolution conversion of the input image, and
   wherein the image processor includes:
      a first resolution converter for performing horizontal resolution conversion and vertical resolution conversion on the input image to produce a fixed resolution-converted image so that a horizontal resolution of the fixed resolution-converted image is equal to the fixed horizontal resolution, and a vertical resolution of the fixed resolution-converted image is equal to the fixed vertical resolution;
      a second resolution converter for performing horizontal resolution conversion and vertical resolution conversion on the fixed resolution-converted image output from the first resolution converter to produce the display resolution-converted image having the user-defined horizontal and vertical resolutions; and
      a frame memory, wherein the fixed resolution-converted image is input from the first resolution converter to the frame memory, and subsequently read out from the frame memory to be input to the second resolution converter, the first resolution converter includes:

a FIFO buffer having a memory area for p pixels where p is an integer more than 1;

a first horizontal resolution converter for converting the horizontal resolution of the input image to produce a first horizontal resolution-converted image having the fixed horizontal resolution;

first line buffers for temporarily storing the first horizontal resolution-converted image sequentially output from the first horizontal resolution converter; and a first vertical resolution converter for converting the vertical resolution of the first horizontal resolution-converted image sequentially output from the first line buffers to produce the fixed resolution-converted image having the fixed horizontal and vertical resolutions, wherein the FIFO buffer sequentially receives the input image signal from a leading pixel of the input image, and outputs image signal in m pixel units to the first horizontal resolution converter where m is an integer greater than 1 and is equal to or less than p, wherein a number of pixels constituting each of the first line buffers is a fixed number which is equal to the fixed horizontal resolution, and wherein the fixed horizontal and vertical resolutions are set equal to the horizontal and vertical resolutions of the fixed-pixel display device.

2. The projector according to claim 1, wherein the second resolution converter includes:

a second horizontal resolution converter for converting the horizontal resolution of the fixed resolution-converted image to produce a second horizontal resolution-converted image having the user-defined horizontal resolution;

second line buffers for temporarily storing the second horizontal resolution-converted image sequentially output from the second horizontal resolution converter; and a second vertical resolution converter for converting the vertical resolution of the second horizontal resolution-converted image sequentially output from the second line buffers to produce the display resolution-converted image having the user-defined horizontal and vertical resolutions, wherein a number of pixels constituting each of the second line buffers is a fixed number which is equal to the horizontal resolution of the fixed-pixel display device.

3. The projector according to claim 1, wherein the second resolution converter changes a projected size of the image according to the user-defined horizontal and vertical resolutions.

4. The projector according to claim 1, wherein the second resolution converter converts an arbitrary portion of the fixed resolution-converted image to the display resolution-converted image having the user-defined horizontal and vertical resolutions.

5. The projector according to claim 1, wherein the first resolution converter includes a FIFO buffer having a memory capacity of p pixels where p is an integer of 2 or greater, the FIFO buffer sequentially receiving the input image signal from a lead pixel of the input image, and outputting the pixel signal in order in m-pixel increments to the first resolution converter, where m is an integer between 2 and p, inclusive.

6. A image processing device for performing resolution conversion on an input image represented by an input image signal to produce a display resolution-converted image having user-defined horizontal and vertical resolutions, wherein a fixed horizontal resolution and a fixed vertical resolution are set in advance in the image processing device for use in the resolution conversion of the input image, and wherein the image processing device includes:

a first resolution converter for performing horizontal resolution conversion and vertical resolution conversion on the input image to produce a fixed resolution-converted image so that a horizontal resolution of the fixed resolution-converted image is equal to the fixed horizontal resolution, and a vertical resolution of the fixed resolution-converted image is equal to the fixed vertical resolution;

a second resolution converter for performing horizontal resolution conversion and vertical resolution conversion on the fixed resolution-converted image output from the first resolution converter to produce the display resolution-converted image having the user-defined horizontal and vertical resolutions; and a frame memory, wherein the fixed resolution-converted image is input from the first resolution converter to the frame memory, and subsequently read out from the frame memory to be input to the second resolution converter, the first resolution converter includes:

a FIFO buffer having a memory area for p pixels where p is an integer more than 1;

a first horizontal resolution converter for converting the horizontal resolution of the input image to produce a first horizontal resolution-converted image having the fixed horizontal resolution;

first line buffers for temporarily storing the first horizontal resolution-converted image sequentially output from the first horizontal resolution converter; and a first vertical resolution converter for converting the vertical resolution of the first horizontal resolution-converted image sequentially output from the first line buffers to produce the fixed resolution-converted image having the fixed horizontal and vertical resolutions, wherein the FIFO buffer sequentially receives the input image signal from a leading pixel of the input image, and outputs image signal in m pixel units to the first horizontal resolution converter where m is an integer greater than 1 and is equal to or less than p, wherein a number of pixels constituting each of the first line buffers is a fixed number which is equal to the fixed horizontal resolution, and wherein the fixed horizontal and vertical resolutions are set equal to the horizontal and vertical resolutions of the fixed-pixel display device.

7. The image processing device of claim 6, wherein the first resolution converter includes a FIFO buffer having a memory capacity of p pixels where p is an integer of 2 or greater, the FIFO buffer sequentially receiving the input image signal from a lead pixel of the input image, and outputting the pixel signal in order in m-pixel increments to the first resolution converter, where m is an integer between 2 and p, inclusive.

8. An image display apparatus for displaying an image, comprising the image processing device according to claim 6.

* * * * *